United States Patent [19]
Doyle

[11] 3,741,427
[45] June 26, 1973

[54] DOUBLE BOILER FOOD TRAY

[75] Inventor: Diane J. Doyle, Western Springs, Ill.

[73] Assignee: Continental Can Company, Inc., New York, N.Y.

[22] Filed: Feb. 8, 1971

[21] Appl. No.: 113,281

[52] U.S. Cl. .................. 220/13, 99/171, 126/377, 220/9 B, 220/10, 220/44 A, 229/3.5 MF
[51] Int. Cl. ............................................. A47j 27/10
[58] Field of Search .................... 220/13, 9 B, 10, 220/44 A; 229/3.5 MF; 99/171, 192 R, DIG. 5; 126/377; 113/116 FF

[56] References Cited
UNITED STATES PATENTS

| 100,863 | 3/1870 | Corbett | 220/13 X |
| 213,029 | 3/1879 | Ashcroft | 126/377 X |
| 525,933 | 9/1894 | Wood | 126/377 |
| 776,025 | 11/1904 | Hillman | 126/377 |
| 2,404,197 | 7/1946 | Sirp | 113/116 FF |
| 2,430,377 | 11/1947 | Vorreyer | 113/116 FF |
| 3,069,043 | 12/1962 | Bishop | 220/13 |
| 3,185,578 | 5/1965 | Scharre | 99/192 X |
| 3,608,770 | 9/1971 | Naimoli | 229/3.5 MF |

*Primary Examiner*—George E. Lowrance
*Assistant Examiner*—James R. Garrett
*Attorney*—Diller, Brown, Ramik & Holt

[57] ABSTRACT

A double boiler food tray, or the like, wherein a cover is fastened to an inner tray such that the fastening means also provides a vent for the escape of steam created during heating.

7 Claims, 6 Drawing Figures

PATENTED JUN 26 1973 3,741,427

INVENTOR
DIANE J. DOYLE

By Dieew. Brown Ramik & Holt
ATTORNEYS

DOUBLE BOILER FOOD TRAY

BACKGROUND OF THE INVENTION

1. Field of the Invention

The invention relates to food trays and more particularly to a double-boiler type food tray which may either be disposable or re-usable. The double-boiler is of the type which is used for containing frozen foods and a chamber is provided between the inner tray and outer tray for containing ice which is changed to steam during the cooking and/or heating process.

2. Description of the Prior Art

In previously known devices, the cover member for the inner tray was fastened to the tray either by adhesives or crimping, or heat-sealing and the like. Such an arrangement required a second manufacturing step to provide vent means for steam escaping during the cooking and/or heating process.

SUMMARY OF THE INVENTION

The invention resides in the provision of a double boiler food tray, or the like, wherein the inner tray is provided with a cover fastened thereto in such a manner to provide the additional benefit of eliminating separate manufacturing steps to produce necessary vent means for the assembled article.

An object of the invention is to provide a food container, or the like, which is comprised of a tray including a bottom member and an upstanding side wall member having a marginal flange formed thereon, and provided with a cover member having a portion thereof contacting the marginal flange wherein fastening means connect the cover member to the marginal flange, these fastening means comprising an opening formed in the marginal flange and an eyelet extending through the opening.

Another object of the invention is to provide a double boiler which is comprised of an outer tray having a bottom wall member and an upstanding wall member in combination with an inner tray which includes a marginal flange resting on the upstanding wall member for supporting the inner tray in spaced relation from the bottom wall member for forming a chamber for ice, or water, or the like. The double boiler includes a cover resting on the marginal flange and is provided with vent means formed in the cover and the marginal flange for connecting the cover thereto and providing vent means which comprises an opening formed in the marginal flange and an eyelet extending through the opening.

DESCRIPTION OF THE PREFERRED EMBODIMENTS

Figure 1:
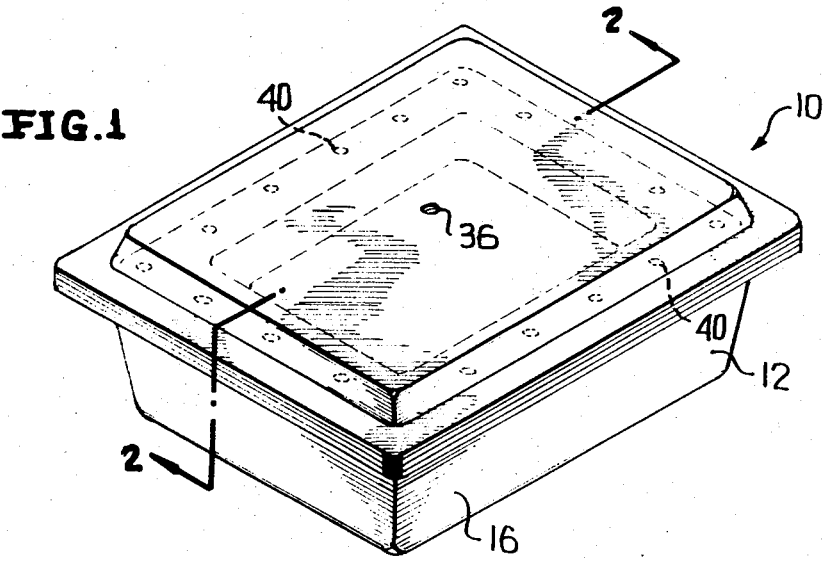
FIG. 1 is a perspective view of an assembled double boiler food tray.

A double boiler food tray, generally indicated by the numeral 10, is comprised of an outer tray 12 having a bottom wall member 14 and an upstanding wall member 16.

An inner tray 18 includes a bottom member 19, an upstanding side wall member 20 and a marginal flange 22 extending outwardly from and along the complete periphery of the side wall member 20. As is best shown in FIG. 2, the marginal flange 22 supports the inner tray 18 in spaced relation above the bottom wall member 14 to provide a chamber 24 which is adapted to contain ice, water, or the like, generally indicated by the numeral 26.

The inner tray 18 is adapted for the packaging of partially or totally prepared food products 28 and is provided with a cover member 30 which has a peripheral portion 32 resting upon the marginal flange 22.

An outer cover 34 rests upon and encloses the inner cover 30. The outer cover 34 is generally provided with a vent 36 which may, during the time prior to use, be covered with an adhesive tab or the like (not shown). Marginal edges of the respective components of the double boiler 10 may be adhered together by adhesive, or heat sealing, or may be assembled together by crimping along the marginal edges in a known manner.

Figure 2:
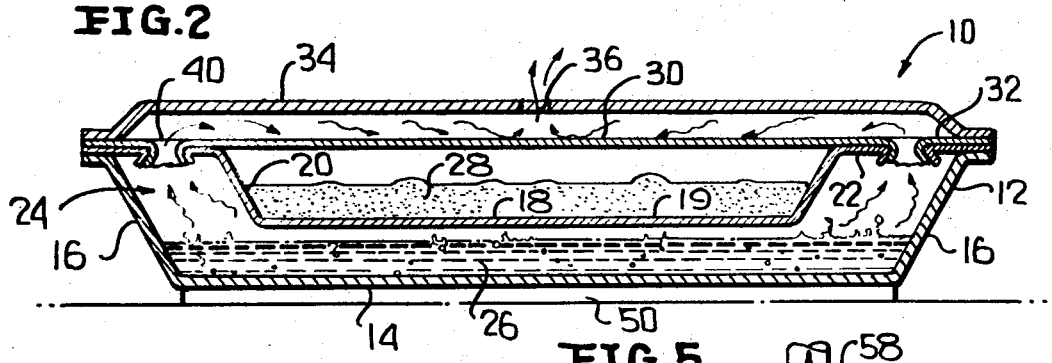
FIG. 2 is a sectional view, taken on the line 2—2 of FIG. 1, showing the inner construction of the novel double boiler.
Figure 3:
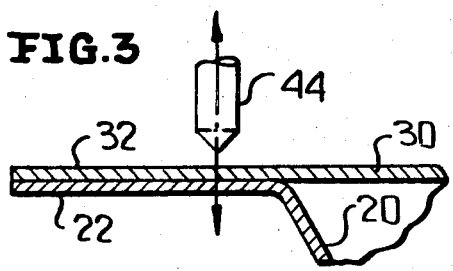
FIG. 3 is a fragmentary showing of a punch member for piercing the cover and marginal flange of the tray.
Figure 4:
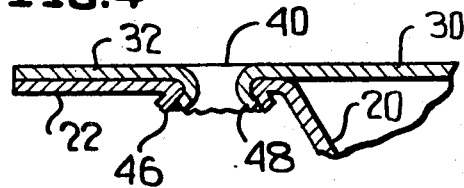
FIG. 4 is a fragmentary illustration of an eyelet produced by the punch member of FIG. 3 and connects the cover to the marginal flange.

As is shown in FIGS. 1, 2 and 4, a plurality of eyelets 40 are formed in the tray 18 and cover 30 through the marginal flange 22 and the portion 32. This eyelet is formed by the punch member 44, as is shown in FIG. 3, which punctures the members to form an opening therein and cause a small portion of material 46 of the marginal flange 22 to be turned back upon itself for forming an opening therein. The eyelet 40 is thus formed integral with and formed from the material of the cover 30 by being forced downwardly and flared outwardly to provide a burr portion 48 which effectively fastens the cover 30 to the tray 18.

As is shown in FIG. 2, the double boiler 10 is used for heating the food products 28 by placing the double boiler 10 upon a heating element or hot plate 50. Ice or water 26 is raised in temperature until steam is created, the steam being in intimate contact with bottom member 18, upstanding wall member 20 and the top portion of cover 30. The steam is vented from the chamber 24 upwardly through eyelets 40 and escapes through the cover vent 36 to the atmosphere. If desired, some moisture can be added to the food product 28 by providing vents in the central portion of the inner cover 30 so that steam and condensed moisture can seep into the tray 18.

The outer tray, inner tray, and inner and outer covers may be formed of fairly heavy aluminum stock, or the like, for providing a re-usable double boiler. When it is desirable to provide a disposable double boiler, such as used for institutional feeding, preparation of meals for serving upon airplanes, trains, long-distance busses, etc., the various trays and covers are formed from relatively thin aluminum stock, or the like, such that the cover 30, for example, can be of aluminum foil.

From the above, it will be apparent that the invention is particularly useful in that the eyelet 40 provides the dual functions of fastening the cover 30 to the inner tray 18 and also provides vent means for permitting steam to escape from the chamber 24 during heating of the food products 28.

Figure 5:
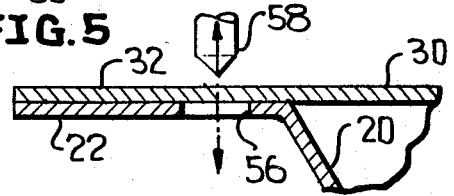
FIG. 5 is a modified form of the invention wherein an opening is pre-formed in the marginal flange thus requiring the punch member to pierce only a single thickness of material.
Figure 6:
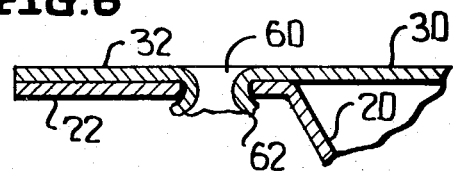
FIG. 6 is a fragmentary view of the fastening eyelet formed in accordance with the showing in FIG. 5.

FIGS. 5 and 6 illustrate a modification of the invention wherein a pre-punched opening 56 is formed in the marginal flange 22. A punch member 58 then forms an eyelet 60 by piercing the material of portion 32, in cover 30, causing the material of the cover to be forced downwardly and flared outwardly to provide burrs 62 which crimp around part of the undersurface of the marginal flange 22.

While preferred forms and arrangement of parts have been shown in illustrating the invention, and preferred methods of forming an eyelet to provide fastening means and vent means have been described, it is to be clearly understood that various changes in details and arrangement of parts may be made without departing from the spirit and scope of the invention as defined in the appended claimed subject matter.

I claim:

1. A container comprising a tray including a bottom member and an upstanding side wall member having a generally radially outwardly extending marginal flange formed thereon, a cover member having a portion thereof contacting said marginal flange, fastening means connecting said cover member to said marginal flange, said fastening means comprising an opening formed in said marginal flange and an eyelet extending through said opening, an outer tray having a bottom wall member and an upstanding wall member, said marginal flange resting directly on said upstanding wall member of said outer tray for supporting said first mentioned tray in spaced relation from said bottom wall member for forming a chamber, said eyelet being located between said side wall member and said upstanding wall member for providing vent means for said chamber.

2. A container as defined in claim 1 wherein said eyelet is integral with and formed from material of said cover.

3. A container as defined in claim 1 wherein said eyelet is crimped about material of said marginal flange turned back upon itself for forming said opening.

4. A double boiler comprising an outer tray having a bottom wall member and an upstanding wall member, an inner tray including a marginal flange resting directly on said upstanding wall member for supporting said inner tray in spaced relation from said bottom wall member for forming a chamber between the trays, a cover resting on said marginal flange, and vent means formed in said cover and said marginal flange and connecting said cover to said marginal flange, said vent means comprising an opening formed in said marginal flange and an eyelet extending through said opening.

5. A double boiler as defined in claim 4 including an outer cover having a central portion overlying and spaced from the first mentioned cover, and a vent opening formed in said outer cover.

6. A double boiler as defined in claim 4 wherein said eyelet is integral with and formed from the material of said cover.

7. A double boiler as defined in claim 4 wherein said eyelet is crimped about material of said marginal flange turned back upon itself for forming said opening.

* * * * *